United States Patent [19]
Lynch et al.

[11] Patent Number: 5,271,557
[45] Date of Patent: Dec. 21, 1993

[54] METHODS AND SYSTEMS FOR GAS TREATMENT

[75] Inventors: R. Larry Lynch, Seattle; Jeffrey Powell, Bellingham, both of Wash.

[73] Assignee: Univar Corporation, Kirkland, Wash.

[21] Appl. No.: 866,888

[22] Filed: Apr. 2, 1992

[51] Int. Cl.$^5$ .................... B01D 3/42; G05D 22/00
[52] U.S. Cl. .................. 236/44 R; 236/12.14; 210/170; 95/17
[58] Field of Search ............... 236/44 R, 44 A, 44 C, 236/12.14, 13; 210/170, 747; 454/253; 55/97, 98, 20, 419, 267, 23; 165/21

[56] References Cited

U.S. PATENT DOCUMENTS

| | | | |
|---|---|---|---|
| 1,531,258 | 3/1925 | Kieser | 236/12.14 |
| 2,656,111 | 10/1953 | Lehane et al. | 236/13 X |
| 3,689,237 | 9/1972 | Stark et al. | 236/12.14 |
| 4,642,127 | 2/1987 | Ando et al. | 55/20 |
| 5,116,515 | 5/1992 | Selesnick | 210/747 X |

Primary Examiner—Harry B. Tanner
Attorney, Agent, or Firm—Stoel Rives Boley Jones & Grey

[57] ABSTRACT

The present invention provides a process for decreasing the relative humidity of a gaseous or vaporous process stream, while increasing the temperature thereof. A preferred embodiment of the process of the present invention is implemented using a bleed valve, a positive displacement blower located downstream therefrom, and a control mechanism for opening and closing the bleed valve. When opened, the bleed valve preferably permits ambient air to admix with the gaseous process feed stream to form the blower feed stream. Increased blower gas throughput results in a lower magnitude gas temperature increase across the blower. The control mechanism used in the practice of the present invention involves monitoring the temperature of the blower effluent (or the gaseous feed to a downstream unit operation), and controlling operation of the bleed valve in accordance with that temperature reading.

45 Claims, 6 Drawing Sheets

METHODS AND SYSTEMS FOR GAS TREATMENT

TECHNICAL FIELD

The present invention involves the processing of gaseous and vaporous streams to modulate the temperature and/or relative humidity thereof in a controlled manner. The methods and systems of the present invention are especially suitable for use in connection with a vapor extraction system utilizing carbon adsorption techniques in a gas cleaning portion of the system.

BACKGROUND OF THE INVENTION

Volatile organic constituents (VOCs), such as methylene chloride, 1,1-dichloroethylene, 1,1-dichloroethane, trans-1,2-dichloroethylene, 1,2-dichloroethane, 1,1,1-trichloroethane, 1,2-dichloropropane, trichloroethylene, tetrachloroethylene, benzene, ethylbenzene, toluene, xylenes and the like are present in soil gas and ground water at various locations throughout the world. Removal of VOCs from gas streams is an important objective of many soil and groundwater remediation programs.

Carbon adsorption techniques for removing chemicals of interest, such as VOCs, from gaseous and vaporous process streams are most efficient when the feed stream is characterized by low relative humidity and moderate temperature. For example, carbon adsorption techniques are generally most effective when input gas streams are at temperatures of less than about 60° C. and more than about 20° C. Moreover, gas streams having a relative humidity in excess of 25% are generally not suitable for processing that involves carbon adsorption techniques, because the carbon may become loaded with water vapor rather than the chemicals of interest.

Obviously, all process streams that might be treated using carbon adsorption do not exhibit the above described temperature and relative humidity characteristics. Conventional soil gas extraction systems employing fans, for example, generally produce a saturated input gas stream at a temperature ranging from about 7° C. to about 13° C. Carbon adsorption is generally not effective to remove chemicals of interest, such as VOCs, from such gas streams. It would be advantageous, therefore, to provide methods and systems for removing VOCs and other contaminants from contaminated gas streams, such as soil gas streams, using carbon adsorption techniques.

SUMMARY OF THE INVENTION

The present invention provides methods and systems for recovering chemical contaminants, such as volatile and semi-volatile organic constituents, from process gas streams using carbon adsorption techniques. More specifically, methods of the present invention are directed to preparation of a gaseous stream, such as a soil gas, for downstream processing using carbon adsorption techniques by modulating its temperature and/or relative humidity. The temperature of a gaseous stream is preferably adjusted to about 20°–60° C., while its relative humidity is adjusted to less than about 25% to facilitate downstream removal of contaminants using, for example, carbon adsorption techniques. Temperature and humidity modulation may be provided by controlled introduction of a modulating gas. Modulating gas having a lower temperature and a lower relative humidity than that of the feed stream is especially preferred. Modulating gas may, for example, comprise ambient temperature, ambient humidity gas such as ambient air.

Preferred methods of the present invention include the following steps:

(1) imparting energy to a process feed stream to produce a higher energy, higher temperature effluent stream;

(2) monitoring the temperature of the effluent stream;

(3) comparing the monitored temperature to first and second predetermined temperature values; and (4) introducing modulating gas or vapor to the feed stream if the monitored temperature exceeds the first predetermined value, and excluding modulating gas or vapor from the feed stream if the monitored temperature is below the second predetermined value.

Improved vapor/gas treatment systems of the present invention preferably incorporate a bleed valve capable of introducing modulating gas to the process stream; a positive displacement blower located downstream therefrom; temperature monitoring means measuring the temperature of the effluent process gas stream from the positive displacement blower; and a control mechanism for opening and closing the bleed valve in response to the monitored temperature. Unlike a fan or similar apparatus, a positive displacement blower imparts energy to the gas moving across it. The temperature of the process gas stream is increased as it is compressed while moving through the positive displacement blower. This temperature increase reduces the relative humidity of the process gas stream.

Specifically, if the monitored temperature of gas exiting the positive displacement blower exceeds a certain specified threshold value, e.g.. 50° C., the bleed valve is opened by the control mechanism. Modulating air is thereby admixed with the gas feed to the positive displacement blower. The increase in volumetric throughput across the positive displacement blower results in a reduction in the energy imparted per unit volume of gas. Consequently, the temperature increase of gas traveling through the blower is modulated, i.e., reduced, and the monitored gas temperature is correspondingly reduced. When the monitored gas temperature falls below a second predetermined temperature, the bleed valve is closed by the control mechanism.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which.

DESCRIPTION OF PREFERRED EMBODIMENTS

While the following discussion is presented in terms of gas treatment as a prelude to carbon adsorption processing, a practitioner in the art would recognize that the processes of the present invention could be used to produce gas streams having suitable relative humidities and temperatures to facilitate other types of subsequent processing. Also, while the following description is set forth primarily in terms of gases, gaseous process streams and the like, it is recognized that the gas streams may comprise vapors, vaporous process streams and the like.

Figures 1, 3:
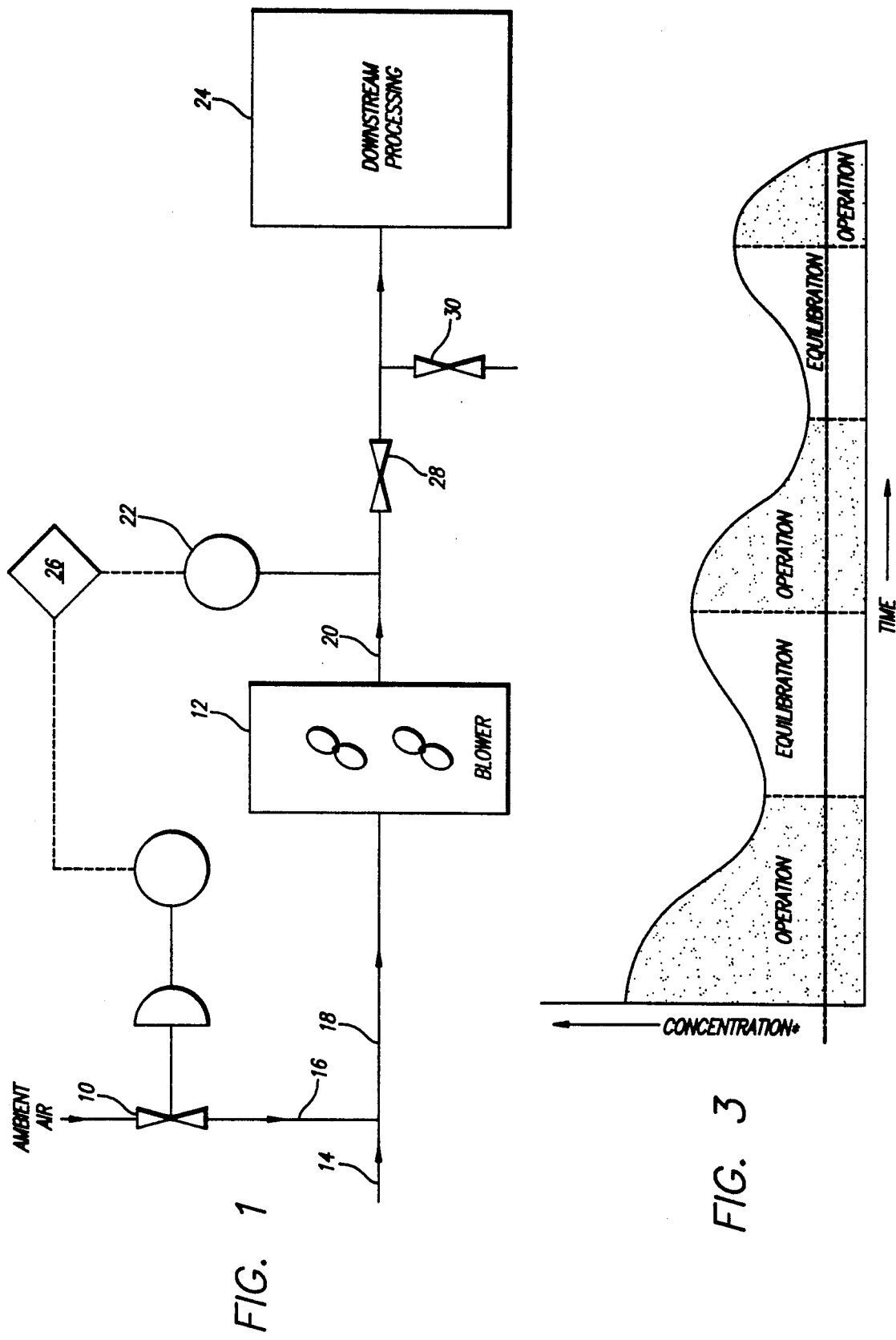
FIG. 1 is a schematic representation of a gas treatment system of the present invention.
FIG. 3 is a schematic concentration/time representation of a soil gas recovery processing sequence involving periods of operation and equilibration.

FIG. 1 illustrates an embodiment of the gas treatment process of the present invention. A bleed valve 10 in communication with a source of modulating gas, such as ambient air, is positioned upstream from a positive displacement blower 12. A gaseous feed stream 14 is therefore admixed with modulating gas stream 16 when bleed valve 10 is open. Gaseous feed stream 14 may originate from a variety of sources. The process of the present invention is particularly advantageous for processing vapor withdrawn from the subsurface to remove contaminants including VOCs and semi-volatile organic constituents from soil gas as part of a soil and/or groundwater remediation system.

Process feed stream 14, alone or in combination with modulating gas stream 16, forms a blower gas feed stream 18. Positive displacement blower 12 imparts energy to gas passing therethrough by compressing it, and the temperature of a blower effluent stream 20 is therefore greater than that of blower feed stream 18. Although utilization of a positive displacement blower is preferred, it will be recognized that other types of processing apparatus such as rotary screw compressors, piston-type vacuum pumps, and the like that modulate, i.e. increase, the temperature of gases passing therethrough may also be suitable.

The temperature of blower effluent stream 20 is monitored by a temperature sensor 22. Although temperature sensor 22 is shown in proximity to blower 12, it may be located in closer proximity to a downstream processing unit 24 that is sensitive to the temperature and/or relative humidity of the process gas stream, such as a carbon adsorption unit. In this latter embodiment, temperature sensor 22 may be thought of as monitoring the gas feed temperature to downstream processing unit 24.

The temperature of gaseous blower effluent 20 monitored by temperature sensor 22 is communicated to controller 26. If the monitored temperature exceeds a first predetermined threshold value, controller 26 directs the opening of bleed valve 10 and modulating gas is introduced to process feed stream 14. Modulating gas introduced by opening bleed valve 10 is preferably at a temperature lower than that of gaseous blower effluent 20. In many applications of the system of the present invention, modulating gas introduced by opening bleed valve 10 is preferably ambient air. If the monitored temperature is below a second predetermined value, controller 26 directs the closure of bleed valve 10.

Pressure relief valve 28 is preferably provided between blower 12 and downstream processing unit 24 to monitor and prevent the buildup of excess pressure. Relief valve 28 functions as a secondary fail-safe mechanism and is operable in the event there is a failure in the automated control system. Additionally, a gas sample may be removed through an optional sample port 30 to monitor gas composition, process efficiency, air quality or any other parameter of interest.

Process feed stream 14 may be provided directly from one or more vapor recovery well installations. Vapor may, for example, be extracted from saturated zones of a water well, or from the top of water wells, as is known in the art. Gas transport between process units is accomplished using commercially available materials and components, as is known in the art.

Bleed valve 10 may be of any construction capable of facilitating the admixture of modulating gas stream 16 and gas input stream 14. To operate in the practice of the present invention, bleed valves 10 must interface with and be subject to the control of controller 26. Appropriate sizing of bleed valve 10 may be accomplished in accordance with engineering principles, depending on factors such as estimated throughput, valve construction, and the like. High performance butterfly valves are generally preferred for systems incorporating conduits having a diameter of greater than about 6 cm, while diaphragm valves with rotary actuators may be preferred for systems with conduits having a smaller diameter. Bleed valves 10 useful in the practice of the present invention are known and commercially available.

Positive displacement blowers 12 useful in the practice of the present invention may be of any construction capable of imparting energy to a gaseous stream and thereby increasing the temperature and concomitantly reducing the relative humidity thereof. The amount of energy imparted by positive displacement blower 12 and, therefore, the magnitude of the gas temperature increase across blower 12 depends, primarily, upon the amount of work done by blower 12. When extracting soil gas, for example, the amount of work done by positive displacement blower 12 is a function of soil conditions. As the tightness of soil packing increases, the amount of work necessary to extract the gas increases. For tightly packed soils such as clays, the temperature of blower feed stream 18 may increase by as much as 75° C. as the gas passes through blower 12. For less tightly packed soils, smaller temperature changes are observed.

The temperature increase of gas passing through positive displacement blower 12 results in a reduction in its relative humidity. The gas temperature increase resulting from passage through positive displacement blower 12 is preferably sufficient to reduce the relative humidity of the process gas stream to less than about 25%, and most preferably less than about 5%.

The operational parameters of the gas treatment system may change in accordance with the conditions of each application. For example, soil gas extracted from the subsurface generally exhibits a temperature ranging from about 7° C. to about 13° C. and is saturated with water vapor. For such saturated, relatively low temperature gases, a temperature increase across positive displacement blower 12 of at least 7°–10° C. about is required to reduce the relative humidity to levels below about 5%. Additionally, process safety considerations suggest that the maximum temperature change across conventional positive displacement blowers 12 is preferably about 65° C.

In a preferred embodiment of the methods and systems of the present invention involving the removal of contaminants, including VOCs, from soil gas by carbon adsorption techniques, the temperature of gaseous process feed stream 14 is increased by about 20° C. to about 42° C. as it traverses positive displacement blower 12. The temperature of process feed stream 14 therefore is increased to about 20° C. to about 60° C., and most preferably to about 30° C. to about 55° C., and its relative humidity is concomitantly decreased to below about 5%. This low relative humidity, moderate temperature blower effluent stream 20 is suitable for effective removal of contaminants such as volatile and semivolatile organic constituents using carbon adsorption techniques in downstream processing unit 24.

Positive displacement blower 12 is preferably capable of providing a vacuum at a gas treatment location. For example, an adjustable vacuum of from about 0 mm Hg to about 100 mm Hg is preferably provided at a soil gas extraction site, such as a wellhead, to facilitate recovery of soil gas from the well. The variable vacuum may be manipulated, for example, to achieve optimum subsurface gas movement.

Positive displacement blower 12 is sized and configured to accommodate the anticipated volume of process gas feed stream 14 as well as the additional volume of modulating gas stream 16 that is intermittently introduced to modulate the temperature and relative humidity parameters of positive displacement blower effluent 20. A practitioner in the art would be able to estimate maximum and minimum positive displacement blower 12 throughput. For example, gas throughputs through positive displacement blower 12 of from about $5.7 \times 10^4$ $cm^3$/sec to greater than $4.7 \times 10^5$ $cm^3$/sec are suitable, and throughputs of up to about $1.42 \times 10^5$ $cm^3$/sec to about $2.8 \times 10^5$ $cm^3$/sec are preferred in applications involving vapor recovery systems for soil gas remediation. Positive displacement blowers 12 suitable for use in the practice of the present invention are known and commercially available. A preferred positive displacement blower is Model 615 U-RAI manufactured by Roots Blower, Connersville, Ind.

Temperature sensor 22 may be of any design that accurately generates an output signal indicative of the temperature of a gaseous process stream. In addition, temperature sensor 22 interfaces with controller 26 and is preferably capable of withstanding extended periods of exposure to gaseous process streams without suffering loss or impairment of function. Temperature sensors 22 useful in the practice of the present invention are known and commercially available. Temperature sensors sold as Model RTD, part number AFJ-COTA04045300, available from Gordon, Richmond, Ill. are suitable.

Controller 26 of the present invention may be of any configuration and design capable of comparing the monitored gas temperature to predetermined temperature values and opening or closing valve 10 in response to the monitored gas temperature. Controller 26 is preferably provided with an input means to facilitate modifications in controller 26 function, e.g., by permitting alteration of the predetermined temperatures at which opening and closing of bleed valve 10 is triggered.

Controllers 26 useful in the practice of the present invention are known and commercially available. A preferred controller 26 for use in the practice of the present invention is a Programmable Logic Controller (PLC), 500 Series Model, manufactured by Texas Instruments, Richardson, Tex. and driven by Ti-Way or Ti-Soft commercial software available from Texas Instruments. Control valve actuators Model ED-10, part number A 905007116 are available from El-O-Matic, Hackensack, N.J.

Controller 26 is programmed to compare measured gas stream temperatures to at least two predetermined temperatures at which valve 10 is opened and closed, respectively. The first predetermined temperature at which valve 10 is opened may correspond to one of the following:

(1) the maximum temperature for effective downstream processing;

(2) a temperature somewhat less than that of (1) above, chosen to achieve enhanced or optimized downstream processing;

(3) a temperature corresponding to the sum of the feed stream temperature and the maximum permissible temperature change across positive displacement blower 12 chosen in accordance with safety considerations or downstream process effectiveness criteria; or (4) a temperature somewhat less than that of (3) above, chosen to achieve enhanced or optimized downstream processing.

According to especially preferred methods and systems of the present invention directed to removal of contaminants such as volatile and semi-volatile organic constituents from soil gas using carbon adsorption techniques, values for the first predetermined temperature corresponding to the S parameters recited above are, for example: (1) 60° C.; (2) 32° C. to 52° C.; (3) 46° C.+blower feed stream temperature; or (4) 4° C. to 21° C.+blower feed stream 18 temperature. In general, the first predetermined temperature at which controller 26 opens valve 10 in a soil gas processing system is from about 30° C. to about 60° C., and most preferably about 50° C. A practitioner in the art would be able to select an appropriate first predetermined temperature based upon relevant parameters of various gas treatment systems.

When bleed valve 10 is opened, modulating gas stream 16, such as ambient air, is delivered to blower feed stream 18. The modulating gas temperature may or may not be less than that of process feed stream 14, although modulating gas having a temperature lower than that of blower feed stream 18 is generally preferred. If the modulating gas temperature is less than that of process feed stream 14, the mere admixture of streams 14 and 16 will generate a blower feed stream 18 having a somewhat reduced temperature. Additionally, modulating gas such as ambient air is not generally saturated with water vapor. Consequently, mere admixture of gas streams 14 and 16 will generally result in a blower feed stream 18 having somewhat reduced relative humidity.

Introduction of modulating gas to blower feed stream 18 increases the volume of gas passing through positive displacement blower 12. Processing of an increased volume of gas across positive displacement blower 12 results in a reduction of the gas temperature increase per unit volume, and the temperature of blower effluent stream 20 monitored by temperature sensor 22 therefore decreases. When the monitored temperature of blower effluent stream 20 is decreased below a second predetermined temperature, controller 26 signals the closure of bleed valve 10.

The second predetermined temperature, at which bleed valve 10 is closed, is lower than the first predetermined temperature which resulted in the opening of bleed valve 10. The second predetermined temperature may represent one of the following temperature values:

(5) the minimum temperature for effective downstream processing;

(6) a temperature greater than (5) to achieve enhanced or optimized downstream processing;

(7) the temperature corresponding the sum of the feed stream temperature and to a minimum temperature change across positive displacement blower 12 allowing effective downstream processing; or (8) a temperature greater than (7) above to achieve enhanced or optimized downstream processing.

According to methods and systems of the present invention directed to removal of volatile and semi-volatile organic constituents from soil gas by means of carbon adsorption processing, values for the second predetermined temperature corresponding to the parameters recited above are, for example, as follows: (5) 30° C.; (6) 32° C. to 52° C.; (7) 4° C.+blower feed stream 18 temperature; or (8) 10° C.+blower feed stream 18 temperature. In general, the second predetermined temperature at which controller 26 closes valve 10 in a soil gas processing system is from about 30° C. to about 62° C., and most preferably about 32° C. A practitioner in the art would be able to select an appropriate second predetermined temperature based upon relevant parameters of various gas treatment systems.

Pressure relief valve 28 may be of any size or configuration allowing sufficient gas to escape to achieve a reduction of gas pressure build up below a threshold value and thereby prevent system overpressure. This threshold value preferably ranges from about 2 mm Hg to about 12 mm Hg, and most preferably about 5 mm Hg. Pressure relief valves 28 useful in the practice of the present invention are known and are commercially available. For example, pressure relief valves available from Roots in Connersville, Ind. are suitable for use in processes of the present invention.

Sample port 30 may be of any size or configuration permitting withdrawal of gas samples from blower effluent 20. Specifically, sample port 30 interfaces with the gas transport components and is capable of interfacing with or providing a sample that may be evaluated by a gas analyzing mechanism (not shown). A number of sample ports may be located along the gas flow path of the process of the present invention to permit more complete evaluation of process performance.

Downstream processing unit 24 comprises a gas treatment apparatus that operates most effectively when the input gas stream has a temperature of from about 30° C. to about 55° C. and low relative humidity. Carbon adsorption processing units are preferred for many applications of the methods and systems of the present invention, e.g., for removal of contaminants such as volatile and semi-volatile organic constituents from soil gas. Disposable carbon adsorption canisters are well known and commercially available. For example, 85 gallon disposable vapor scrub carbon canisters available from Cameron Yakima, Yakima, Wash. are suitable for methods and systems of the present invention.

Figure 2:
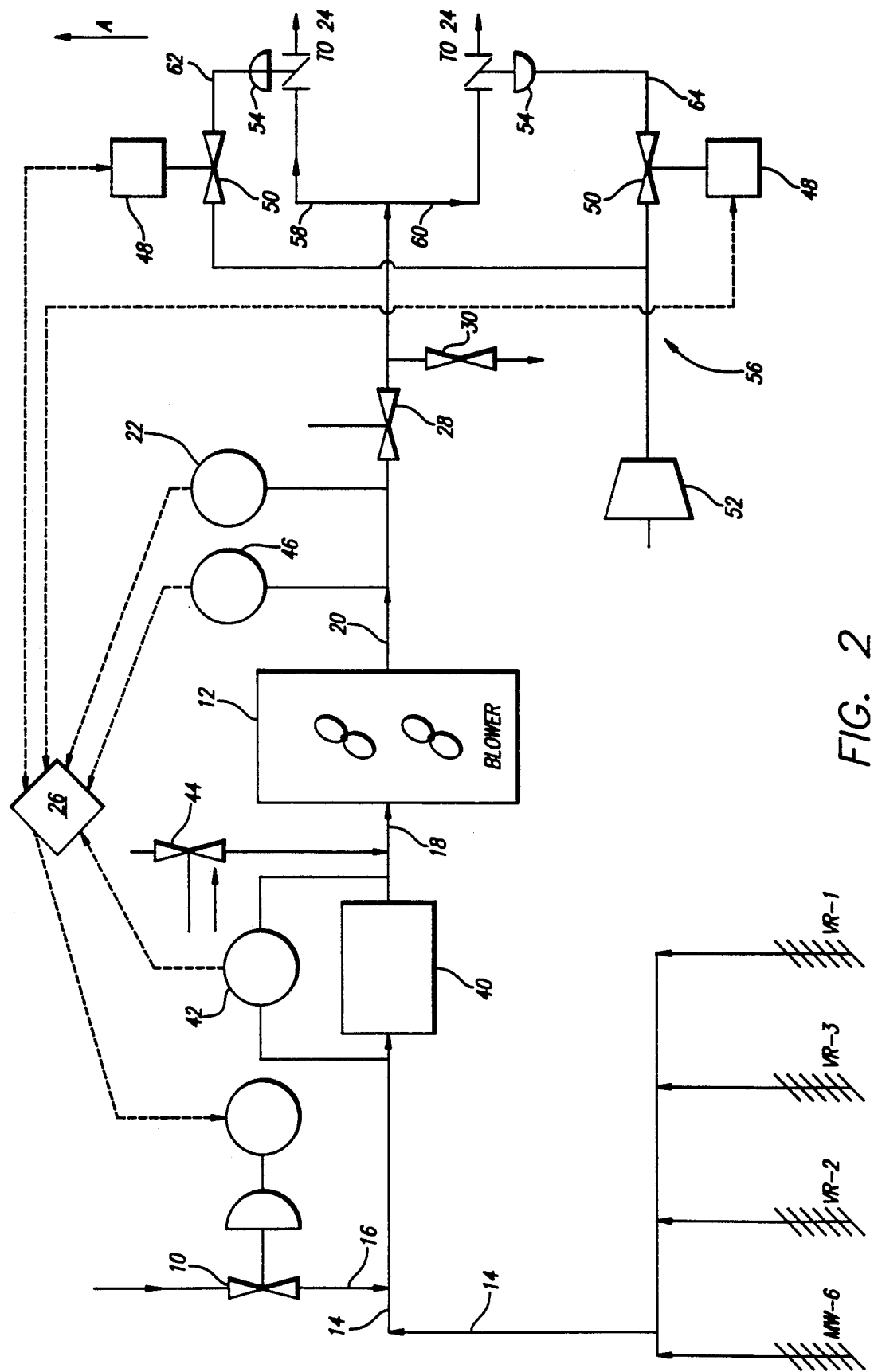
FIG. 2 is a schematic representation of the experimental design of a vapor recovery gas treatment system of the present invention featuring parallel, dual downstream processing units.

FIG. 2 depicts an alternative embodiment of the vapor recovery and treatment system of the present invention for extracting and treating vapor from monitoring well (MS-6) and vapor recovery wells (VR-1–VR-3). Construction of the monitoring and vapor recovery wells is described, in detail, in the Experimental Results, presented below.

A modulating gas stream 16 may be introduced through bleed valve 10 to process feed stream 14 in the same manner as described previously with reference to the embodiment of the present invention shown in FIG. 1. Additionally, an inlet filter 40 is optionally employed to remove particulate contaminants from the admixture of streams 14 and 16. The pressure of both the feed to and effluent from inlet filter 40 is preferably monitored by a pressure sensor 42. Pressure sensor 42 communicates with controller 26 to monitor the pressure change across inlet filter 40. If the pressure change is greater than a predetermined value, controller 26 opens vacuum break valve 44 to reduce the vacuum across inlet filter 40. The filtered and pressure-monitored gaseous stream constitutes blower feed 18 to positive displacement blower 12.

Blower effluent 20 is monitored by a pressure sensor 46 in addition to temperature sensor 22. Temperature sensor 22 operates in conjunction with controller 26 as described above with respect to FIG. 1. Pressure sensor 46 monitors the back pressure generated by downstream processing unit 24. If the back pressure exceeds a predetermined threshold value, downstream processing unit 24 is taken off-line. To achieve continuous operation, more than one downstream processing unit may be arranged in parallel. In such a configuration, a downstream processing unit 24 generating a back pressure greater than the threshold value may be taken off-line and replaced by a previously off-line downstream processing unit 24. If each parallel downstream processing unit generates a back pressure in excess of the threshold value, the entire process is shut down. Pressure relief valve 28 and sample port 30 operate in the same manner as described in the discussion of FIG. 1.

Inlet filters 40 may be of any size or configuration capable of removing particulate contaminants from process feed stream 14 and ambient air stream 16. Removal of particulate materials protects positive displacement blower 12 and other downstream process components from damage caused by particulate contaminants. Inlet filters 40 useful in the practice of the present invention are known and commercially available. For example, filters having a pore size of about 5 microns available from Stoddard Silencer, (Grayslake, Ill., as Model F69-6, part number 45018, are suitable.

Vacuum break 44 admits gas, as necessary, to achieve a reduction in gas vacuum build-up and thereby prevent excess vacuum accumulation. Suitable vacuum break devices are well known in the art. The vacuum break device is preferably selected to match the adjustable vacuum capacity of positive displacement blower 12. A preferred vacuum break device for use in a system of the type illustrated is manufactured by Kunkel and identified as Model VS, Part No. SKS.

Pressure sensors 42 and 46 may be of any configuration capable of generating an accurate pressure signal indicative of the pressure of a gaseous process stream. Additionally, pressure sensors 42 and 46 interface with controller 26 and, preferably, are capable of withstanding extended periods of exposure to gaseous process streams without suffering loss or impairment of function. Pressure sensors 42 and 46 useful in the practice of the present invention are known and commercially available. For example, a pressure sensor available from Data Instrument, Acton, Mass., Model Data Mate 15, may be used in processes of the present invention.

FIG. 2 illustrates a process configuration designed to accommodate two parallel downstream processing units 24. For the purposes of this discussion, the term "upper" connotes process components disposed further in the direction of arrow "A" located on FIG. 2. Controller 26 communicates with a set of two switches 48. Each switch 48 is preferably a solenoid-activated switch and is operably connected to a flow control valve 50. As shown in FIG. 2, flow control valves 50 are preferably pneumatic and therefore capable of being driven by a compressor 52. Each pneumatic flow control valve 50 is operably connected to a pressure controlled valve 54. Compressor 52, switches 48, flow control valves 50 and pressure controlled valves 54 form a downstream processing unit selection mechanism 56.

Selection mechanism 56 provides a flow path for blower effluent stream 20 to the appropriate downstream processing unit 24. More specifically, blower effluent 20 flows along a path 58 to upper downstream unit 24 or along a path 60 to lower downstream unit 24. For example, if upper switch 48 is activated, upper flow control valve 50 is opened, allowing compressed gas to flow therethrough along a flow path 62. The pressure exerted by the gas flowing along path 62 actuates upper pressure controlled valve 54, which opens flow path 58 culminating at upper downstream processing unit 24 to blower effluent 20.

Flow path 58 is closed when upper switch 48 is deactivated, resulting in closure of upper flow control valve 50 and preventing compressed gas from flowing along path 62 to actuate upper pressure controlled valve 54. Similarly, flow path 60 is open to receive blower effluent 20 when lower switch 48 is activated to open lower flow control valve 50, so that gas generated by compressor 52 flows along a flow path 64 to actuate lower controlled pressure valve 54. Deactivation of lower switch 48 closes flow path 60 to blower effluent 20.

Components of downstream processing unit selection mechanism 56 useful in the practice of the present invention are known and commercially available. Selection mechanism 56 may be arranged to accommodate any number of downstream processing units 24, and a practitioner in the art would be able to determine an appropriate configuration of selection mechanism 56 to accommodate downstream units 24. Selection mechanism 56 may also be used to facilitate replacement of spent processing units 24, such as carbon adsorption canisters.

The process of the present invention employing parallel downstream processing units 24 may be controlled manually or automatically. For manual applications, an operator selects the downstream unit operation for engagement. For automatic applications, switching between downstream units 24 is conducted, for example, on a timed cycle. For carbon adsorption of volatile and semi-volatile organic constituents from soil gas, for example, the timed cycle is selected to optimize carbon utilization. A practitioner in the art would therefore be able to select and implement an appropriate timed switching cycle for alternating among multiple downstream processing units. Timers facilitating such automatic operation are known and readily available.

The process of the present invention may be operated as a closed system in an enclosed area. The entire processing system may, for example, be installed in a portable trailer and moved from site to site as necessary to facilitate remediation efforts. In such applications, ventilation is important to avoid the accumulation of toxic or explosive fumes. Cross ventilation is preferred for this purpose. Ventilation may be achieved by providing plurality of ventilation fans (not shown). The ventilation fans are preferably interlocked through controller 26 with positive displacement blower 12, such that blower 12 cannot be actuated unless the ventilation fans are operating.

Alternative or supplemental humidity control mechanisms (not shown) may optionally be included in the system of the present invention to ensure that the relative humidity of blower effluent 20 is less than a predetermined threshold value. In the processing of soil gas utilizing carbon adsorption techniques, the relative humidity threshold value is about 25%, with a relative humidity value of less than about 5% being preferred. Appropriate humidity control mechanisms are well known in the art.

Audible noise generated by systems of the present invention may reach unacceptable levels, particularly if the system is operated as a closed system in an enclosed area. Under such circumstances, a silencer may be provided to muffle the sound. Suitable silencers are commercially available. A preferred silencer for use in the system of the present invention is available from Stoddard Silencer in Grayslake, Ill. and is identified as Model D13-6, Part No. 71009.

For applications of the present invention involving soil gas extraction and removal of contaminants such as VOCs from soil gas streams utilizing carbon adsorption techniques, it may be unnecessary or undesirable to operate the system continuously over the course of months or years. FIG. 3 is a schematic representation of the predicted performance of the process of the present invention during cycling (i.e.. repeated periods of operation and equilibration) of the system.

Discontinuous operation is preferred for many applications of the present invention because, as contaminants such as VOCs are removed from the soil gas, the concentration of VOCs in the soil gas feed stream decreases in a manner that may be envisioned as an "S" curve approaching an asymptotic value. As the VOC concentration reduction diminishes when the VOC concentration approaches the asymptotic value, operation of positive displacement blower 12 of the present invention is discontinued and subsurface conditions are permitted to equilibrate. When the system is inactivated, the groundwater/soil gas equilibrium is at least partially restored. The VOC concentration at the new groundwater/soil gas equilibrium, or the state approaching equilibrium, is increased above the asymptotic value, although it does not return to the level found in the soil gas prior to an operational cycle of the system of the present invention. Once soil gas sampling confirms the groundwater/soil gas equilibrium has been restored or has increased above the asymptotic value, for example, processing operations may be resumed. Cycling of the soil/gas processing system is preferably continued until no appreciable effect on VOC concentration is observed. Operational cycles having a duration of about one week to about 12 weeks are generally suitable, depending on subsurface conditions.

A specified VOC may be chosen as the indicator to system cycling involved in the practice of the present invention. A gas concentration detector (not shown) capable of generating an output signal indicative of an indicator VOC concentration in a gaseous process stream is therefore useful in the process of the present invention. For soil gas remediation purposes, for example, perchloroethylene (PCE) is an appropriate indicator VOC. Such gas concentration detectors preferably interface with controller 26 and are capable of withstanding extended periods of exposure to gaseous process streams, without suffering loss or impairment of function. Suitable gas concentration detectors useful in the practice of the present invention are known and commercially available.

EXPERIMENTAL RESULTS

Four vapor recovery wells designated VR-1 through VR-4 were installed. The vapor recovery well borings were completed to depths of approximately 24.4 m, which generally provided approximately 1.5 m penetration into the top of the saturated zone. Boreholes for the vapor extraction wells were advanced using "drill-through-casing-driver" techniques with a 650 w/s Chicago Pneumatic drilling rig. The drilling procedure involved continuously driving 20 cm, Schedule 40 steel casing with a pneumatically operated hammer, and using air rotary drilling methods inside the casing for removal of borehole materials.

The vapor recovery wells were completed with 10 cm diameter, Schedule 80 PVC well screen and blank casing. The lower 12.2 m of each well was constructed of machine slotted well screen. The bottom 6.1 m of screen (250 micron slot) was extended approximately 1.5 m into the saturated zone to permit groundwater sampling. Clean, 10 to 20 mesh prepackaged silica sand was used as a filter for this zone. The upper 6.1 m of screen was 2.03 mm slot screen and clean, 4 by 8 mesh, fine silica gravel was used as a filter material for that section of the well. Two stainless steel centralizers were installed in the screened well section to center the well in the borehole and to facilitate placement of the filter pack and seal material. The wells were completed by installing an annular seal consisting of about 0.9 m to 1.2 m of bentonite pellets on top of the filter pack and overlaying with bentonite/cement grout to just below the grade surface.

Groundwater monitoring wells designated MW-1 through MW-8 and soil gas probes designated SG-1 and SG-2 were also installed. A vapor extraction/air polishing unit of the type described above utilizing carbon-adsorption techniques was installed to remove VOCs from gas extracted from the vapor recovery wells VR-1, VR-2, VR-3 and groundwater monitoring well MW-6, as shown in FIG. 2. The gas processing unit was a self-contained, trailer mounted modular system comprising a positive displacement blower Model 615 U-RAI available from Roots Blower, Connersville, Ind.; 85 gallon vapor scrub activated carbon canisters from Cameron Yakima, Yakima, Wash.; and associated control equipment, including a Texas Instruments Model 525 programmable logic controller. The first predetermined temperature was about 52° C., while the second predetermined temperature was about 60° C. A bleed valve modulated the gas temperature/relative humidity in response to gas temperature measurements as described above.

The positive displacement blower provides an adjustable vacuum of between about 0 and 100 mm Hg. at the vapor recovery wellhead. The vacuum suction was varied to assure optimal gas movement in the subsurface. Gas was processed through the blower to the activated carbon canisters at a rate of up to about $2.12 \times 10^5$ cm$^3$/sec.

Figure 4A:
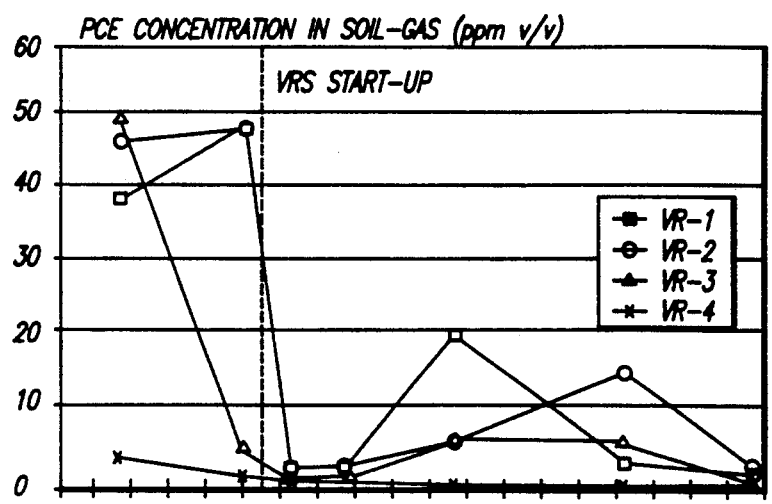
FIG. 4a graphically illustrates the perchloroethylene (PCE) concentration in soil gas (expressed as ppm, v/v) at experimental vapor recovery wells VR-1–VR-4 over a time period extending both before and after startup of vapor recovery treatment according to the present invention.
Figure 4B:
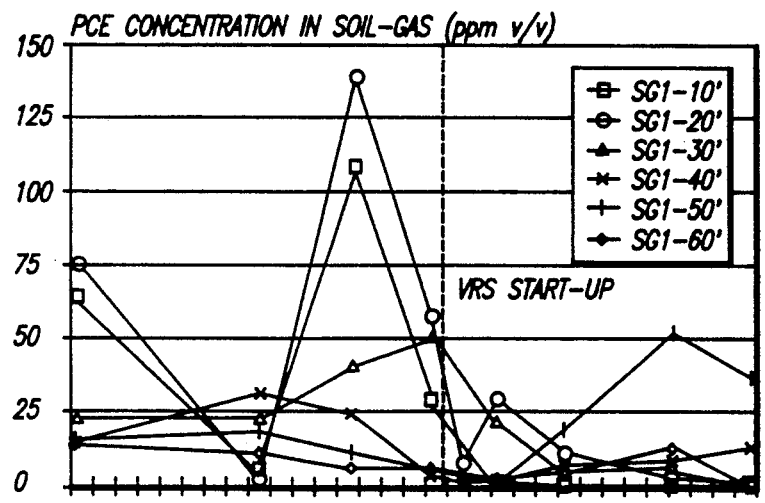
FIG. 4b graphically illustrates the PCE concentration in soil gas (expressed as ppm, v/v) at various depths of experimental soil gas probe, SG1, over a time period extending both before and after startup of vapor recovery treatment according to the present invention.
Figure 4C:
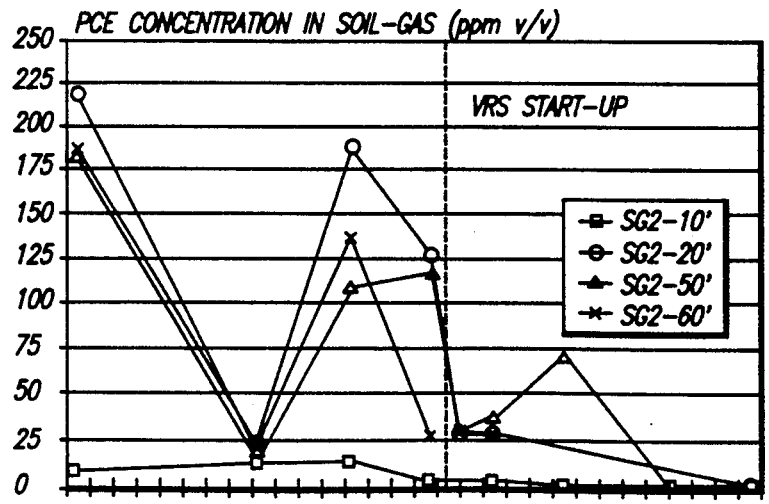
FIG. 4c graphically illustrates the PCE concentration in soil gas (expressed as ppm, v/v) at various depths of an experimental soil gas probe, SG2, over a time period extending both before and after startup of vapor recovery treatment according to the present invention.
Figure 5A:
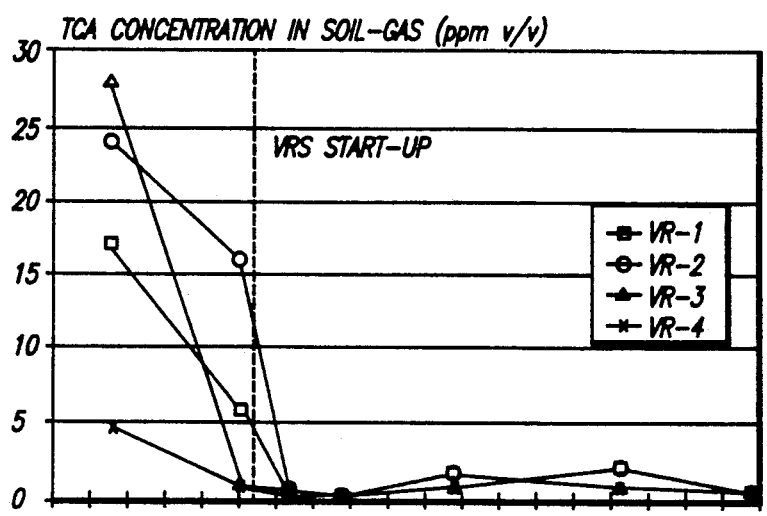
FIG. 5a graphically illustrates the 1,1,1-trichloroethane (TCA) concentration in soil gas (expressed as ppm, v/v) at experimental vapor recovery wells VR-1–VR-4 over a time period extending both before and after startup of vapor recovery treatment according to the present invention.
Figure 5B:
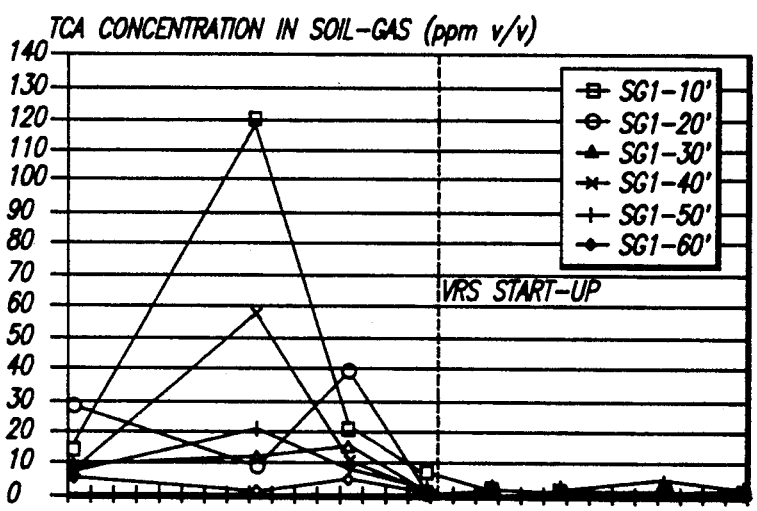
FIG. 5b graphically illustrates the TCA concentration in soil gas (expressed as ppm, v/v) at various depths of experimental soil gas probe, SG1, over a time period extending both before and after startup of vapor recovery treatment according to the present invention.
Figure 5C:
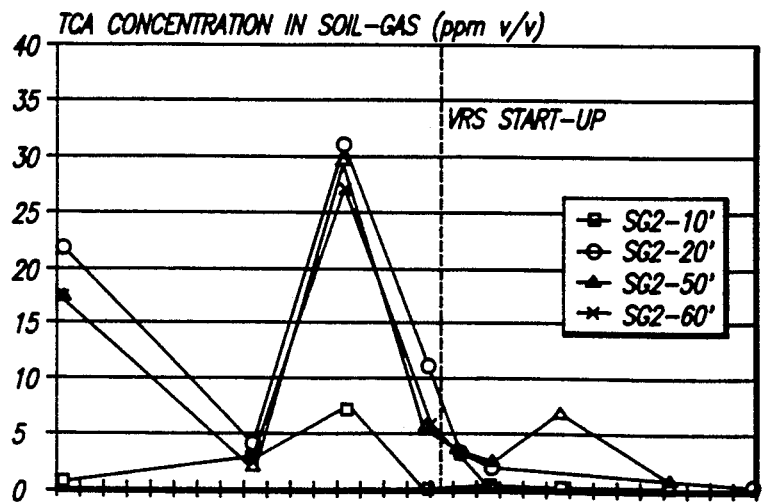
FIG. 5c graphically illustrates the TCA concentration in soil gas (expressed as ppm, v/v) at various depths of an experimental soil gas probe, SG2, over a time period extending both before and after startup of vapor recovery treatment according to the present invention.
Figures 6A, 6B, 6C:
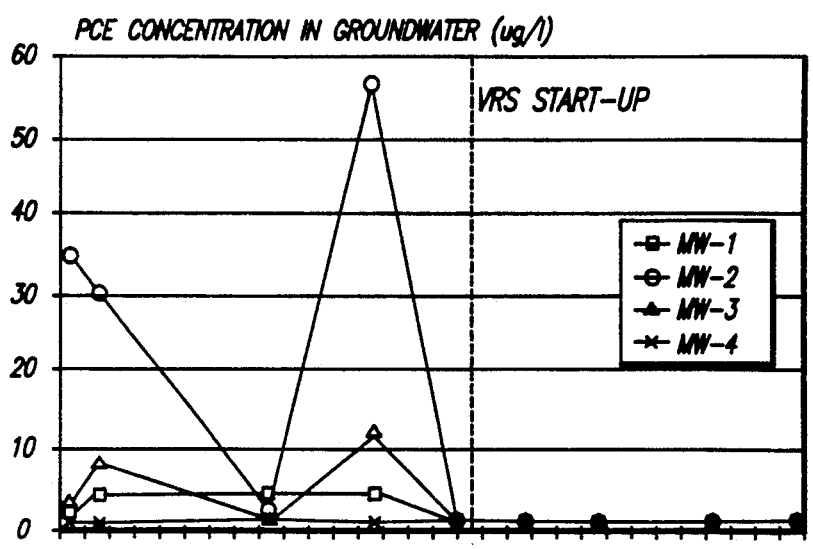
FIG. 6a graphically illustrates the PCE concentration in groundwater (expressed as ug/L) at experimental monitoring wells MW-1–MW-4 over a time period extending both before and after startup of vapor recovery treatment according to the present invention.
FIG. 6b graphically illustrates the PCE concentration in groundwater (expressed as ug/L) at experimental monitoring wells MW-5–MW-8 over a time period extending both before and after startup of vapor recovery treatment according to the present invention.
FIG. 6c graphically illustrates the PCE concentration in groundwater (expressed in ug/L) at experimental vapor recovery wells VR-1–VR-4 over a time period extending both before and after startup of vapor recovery treatment according to the present invention.
Figure 7A:
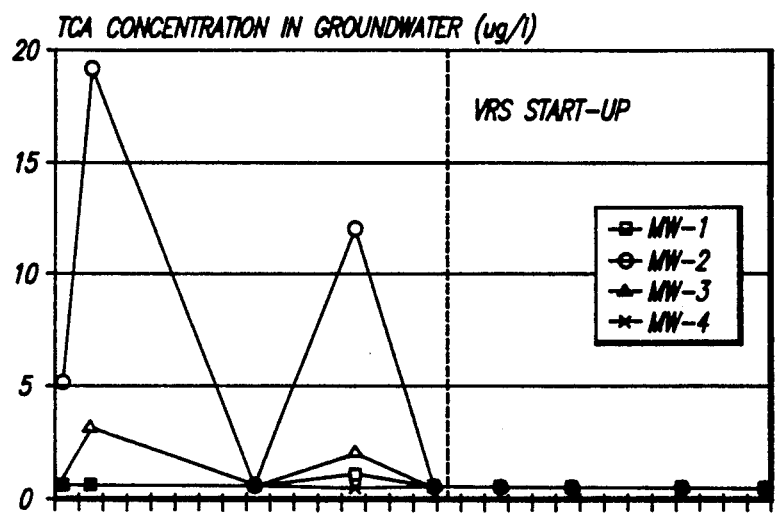
FIG. 7a graphically illustrates the 1,1,1-trichloroethane (TCA) concentration in groundwater (expressed as ug/L) at experimental monitoring wells MW-1–MW-4 over a time period extending both before and after startup of vapor recovery treatment according to the present invention.
Figure 7B:
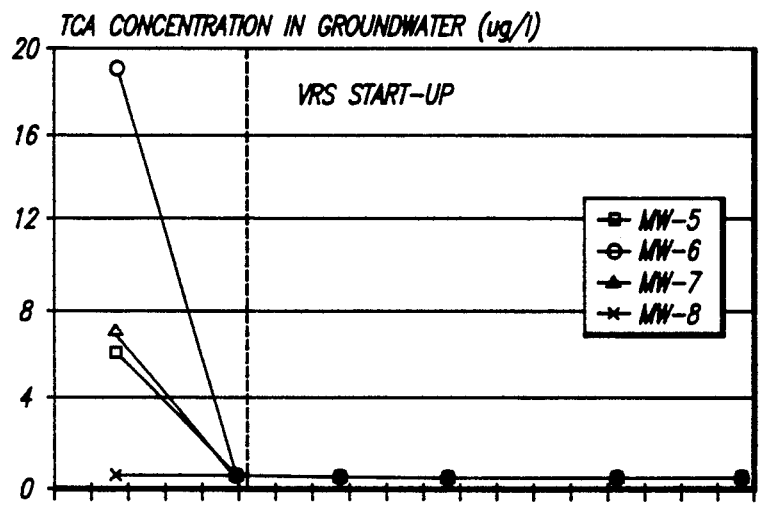
FIG. 7b graphically illustrates the TCA concentration in groundwater (expressed as ug/L) at experimental monitoring wells MW-5–MW-8 over a time period extending both before and after startup of vapor recovery treatment according to the present invention.
Figure 7C:
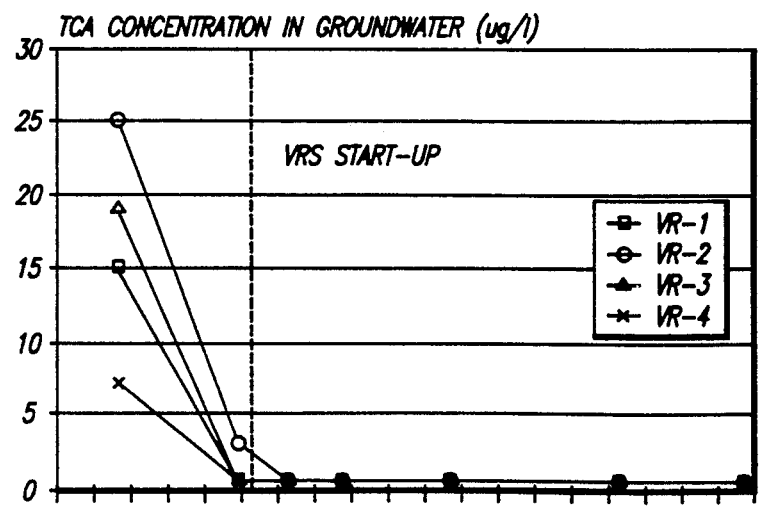
FIG. 7c graphically illustrates the TCA concentration in groundwater (expressed in ug/L) at experimental vapor recovery wells VR-1–VR-4 over a time period extending both before and after startup of vapor recovery treatment according to the present invention.

A summary of the results of this testing is shown in FIGS. 4(a-c), 5(a-c), 6(a-c) and 7(a-c). FIGS. 4(a-c) and 5(a-c) indicate the PCE and TCA soil gas concentrations, respectively, at VR-1 through VR-4 (illustrations (a)); at SG-1 at depths of ten feet, twenty feet, thirty feet, forty feet, fifty feet and sixty feet (illustrations (b)); and at SG-2 at depths of ten feet, twenty feet, fifty feet and sixty feet (illustrations (c)). FIGS. 6(a-c) and 7(a-c) indicate the groundwater PCE and TCA concentrations, respectively, in MW-1–MW-4 (illustrations (a)); MW-5–MW-8 (illustrations (6)); and VR-1–VR-4 (illustrations (c)).

Prior to initial operation of the vapor recovery system of the present invention, sampling and analysis of VOCs in soil gas and groundwater was conducted to establish initial, pre-operational conditions. Soil gas samples were collected for analysis from monitoring well MW-6, vapor recovery wells VR-1 through VR-4, as well as soil gas probes SG-1 and SG-2. Based upon the laboratory findings regarding these samples, the vapor extraction and treatment system of the present invention were implemented at wells VR-1, VR-2, VR-3 and MW-6.

The process of the present invention was initially operated for a one month time period. VOC concentration measurements were taken after a one month operational cycle and an approximately two month equilibration period was commenced. The initial post-operational sampling included soil gas samples from VR-1 through VR-4 and soil gas probes SG-1 and SG-2. Groundwater samples were collected from VR-1 through VR-3. When compared with pre-operational concentration values, significant decreases in VOC concentrations in soil gas and groundwater were observed.

Concentration samples were also taken 45 days after shut down of the first operational cycle. Groundwater samples were collected from MW-1 through MW-8 and VR-1 through VR-4. Soil gas samples were collected from VR-1 through VR-4 and soil gas probes SG-1 and SG-2. Groundwater VOC concentrations were below the detection limit (BDL) of 1.0 mg/l. Soil gas VOC concentrations generally increased above initial post-operational levels, but remained significantly below pre-operational levels.

The vapor recovery system was restarted after an equilibration period of about two months and operated for a second cycle of about seven weeks. It was thereafter shut down again for a period of about seven weeks. Groundwater and soil gas samples were collected as described above with reference to the first cycle. PCE concentrations ranging from 1 to 7 ug/l were detected in the groundwater samples from VR-1, VR-2 and VR-3, representing an increase over earlier levels. Soil gas sampling results indicated a general increase in VOC levels over earlier levels for VR-1 through VR-4 and SG-2. SG-2 samples were available only at depths of ten feet and fifty feet, because the ports of the twenty and foot probes had rusted closed. For SG-1, soil gas VOC concentration showed a decrease in the shallow (ten, twenty and thirty foot depth) probes and an increase in the deeper (forty, fifty and sixty foot depth) probes. The later VOC concentration levels remained significantly less than pre-operational levels, however.

The vapor recovery system was again reactivated and operated for a seven week period. It was thereafter shut down for several months. Sampling was conducted about 11 weeks after shutdown. Groundwater and soil gas samples were collected as in the earlier samplings, with soil gas samples additionally collected from MW-1 through MW-8. Groundwater analyses detected PCE concentrations ranging between 6 and 17 ug/l for MW-5, MW-6 and MW-7, which had exhibited BDL results after the second operational cycle. The VR-2 groundwater PCE level increased from 7 ug/l in May to 28 ug/l after the third cycle. Slight decreases in PCE concentration were observed for VR-1 (1 ug/l to BDL) and VR-2 (6 to 2 ug/l). BDL results were observed for other wells.

Soil gas PCE concentration changes between post-second and post-third operational cycles were as follows: VR-1 showed a decrease; VR-2 showed an increase; VR-3 was relatively unchanged; VR-4 was relatively unchanged; SG-2 showed significant decreases at all depths; and SG-1 showed increases at all but the twenty foot depth. All of the monitoring wells showed a decrease in PCE concentration in soil gas from the pre-operational levels.

Additional sampling was conducted about 7 months after shutdown of the third operational cycle. The vapor recovery system was restarted one month later. Soil gas samples were taken from the vapor recovery wells and soil gas probes, while groundwater samples were collected from the monitoring wells and the vapor recovery wells. Prior to the fourth operational cycle, the groundwater results were all BDL, with the exception of a PCE concentration of 3 ug/l detected for VR-2. PCE concentration therefore decreased in MW-5, MW-6, MW-7, VR-2 and VR-3 between the two samples taken after the third operational cycle. The later results indicate a decrease in PCE soil gas concentration for VR-1 through VR-4. SG-1 exhibited a decrease in PCE soil gas concentration in all but the ten and forty foot probes, which showed minor increases.

The analytical data discussed above and graphically shown in FIGS. 4–7 demonstrate that the practice of the present invention is effective in reducing VOC levels in both soil gas and groundwater. VOC concentrations in soil gas and groundwater fluctuated from sampling event to sampling event. In each sampling that followed the initial implementation of the process of the present invention, VOC concentrations remained significantly less than pre-operational levels, however.

Several important trends were identified from the analytical results. First, a marked decrease in soil gas VOC concentrations was observed, with a very rapid decrease occurring in the first month of operation of the process of the present invention. Second, seasonal variations in soil gas VOC concentrations were observed, with the highest levels occurring in the summer. Operation of the process of the present invention appeared to dampen this seasonal effect. In addition, SG-1 data indicated a decrease in VOC concentration in soil gas at shallow (ten to thirty foot depths) accompanied by an increase in concentration at deeper (forty to sixty foot depths). These results may indicate downward migration of soil gas in the vadose zone under the influence of the process of the present invention.

Groundwater analytical data (FIGS. 6 and 7) mimics at least the first two trends observed above for soil gas VOC concentration. This similarity in result is indicative of a direct relationship between reduced VOC concentration in soil gas and groundwater, and is not surprising because the VOCs in soil and soil gas serve as a VOC source for groundwater. Consequently, removal of the soil and soil gas VOC source is likely to reduce the VOC concentration in groundwater. Operation of the present invention may therefore be conducted until acceptable soil gas and groundwater VOC levels are attained.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A method of reducing the relative humidity of a gaseous or vaporous process feed stream comprising:

(1) imparting energy to the feed stream to produce a higher energy, higher temperature effluent stream;

(2) monitoring the temperature of the effluent stream;

(3) evaluating the monitored temperature to determine whether it exceeds a first predetermined value; and (4) introducing a modulating gas or vapor to the feed stream if the monitored temperature exceeds the first predetermined value.

2. A method according to claim 1, further comprising:

(5) evaluating the monitored temperature to determine whether it is less than a second predetermined temperature; and (6) ceasing introduction of the modulating gas if the monitored temperature is less than the second predetermined temperature.

3. A method according to claim 1 wherein imparting energy to the feed stream is accomplished by passing the feed stream through a positive displacement blower.

4. A method according to claim 1 wherein the first predetermined temperature is selected from (1) a maximum temperature for effective downstream processing;

(2) a temperature less than that of (1) above chosen to achieve enhanced or optimized downstream processing;

(3) a temperature corresponding to a maximum temperature change across the positive displacement blower chosen in accordance with safety consideration or downstream process effectiveness criteria; or (4) a temperature less than that of (3) above corresponding to a lesser temperature change across the positive displacement blower chosen to achieve enhanced or optimized downstream processing.

5. A method according to claim 1 wherein the first predetermined temperature is from about 30° C. to about 60° C.

6. A method according to claim 1 wherein the first predetermined temperature is about 50° C.

7. A method according to claim 4 wherein the temperature change across the positive displacement blower is from about 20° C. to about 42° C.

8. A method according to claim 2, wherein the second predetermined temperature is selected from (1) a minimum temperature for effective downstream processing;

(2) a temperature greater than 1 above chosen to achieve enhanced or optimized downstream processing;

(3) a temperature corresponding to a minimum temperature change across the positive displacement blower allowing effective downstream processing; or (4) a temperature greater than that of 3 above corresponding to a greater temperature change across the positive displacement blower chosen to achieve enhanced or optimized downstream processing.

9. A method according to claim 2 wherein the second predetermined temperature is from about 30° C. to about 62° C.

10. A method according to claim 2 wherein the second predetermined temperature is about 32° C.

11. A method according to claim 8 wherein the temperature change across the positive displacement blower is between about 20° C. and about 42° C.

12. A method according to claim 1 wherein the relative humidity of the feed stream is greater than about 25% and the relative humidity of the effluent stream is less than about 25%.

13. A method according to claim 1 wherein the relative humidity of the effluent stream is less than about 5%.

14. A method according to claim 1, further comprising filtering the process feed stream prior to imparting energy to at least partially remove particulate material from the feed stream.

15. A method according to claim 1, further comprising selecting a downstream processing unit from a parallel configuration of a plurality of downstream processing units to facilitate continuous use of the method.

16. A method according to claim 15 wherein selecting the downstream processing unit comprises:

(1) actuating one of a plurality of switches;

(2) opening a flow control valve corresponding to the actuated switch;

(3) passing a pressure-generating medium through the open flow control valve along an open control flow path;

(4) actuating a pressure controlled valve situated along the open flow control path to provide an open downstream processing unit selection path.

17. A method according to claim 16 wherein the pressure-generating medium is a gas or a vapor.

18. A method according to claim 15, further comprising monitoring the back pressure generated by an on-line downstream processing unit and evaluating whether the monitored back pressure exceeds a threshold back pressure value prior to selecting the downstream processing unit.

19. A method according to claim 18 wherein the threshold back pressure value is about 4 mm Hg.

20. A method according to claim 1, additionally comprising imparting energy to the feed stream by compressing the feed stream.

21. A method according to claim 1, additionally comprising imparting energy to the feed stream by heating the feed stream.

22. A method according to claim 1, wherein the temperature of the modulating gas or vapor is less than that of the feed stream.

23. A method according to claim 1, wherein the relative humidity of the modulating gas or vapor is less than that of the feed stream.

24. A method according to claim 1, wherein the modulating gas or vapor is ambient air.

25. A method according to claim 2, wherein the second predetermined temperature is lower than the first predetermined temperature.

26. A method for treating soil gas extracted from a subsutface location comprising:

(1) extracting a soil gas process feed stream from a subsurface location;

(2) imparting energy to the feed stream to produce a higher temperature effluent stream;

(3) monitoring the temperature of the effluent stream;

(4) evaluating the monitored temperature of the effluent stream to determine whether it exceeds a first predetermined value; and (5) introducing a modulating gas or vapor to the feed stream if the monitored temperature of the effluent stream exceeds the first predetermined value.

27. A method according to claim 20, additionally comprising treating the effluent stream in a processing unit to remove contaminants.

28. A method according to claim 27, wherein the processing unit employs carbon adsorption techniques.

29. A method according to claim 20, further comprising:
(6) evaluating the monitored temperature to determine whether it is less than a second predetermined temperature; and
(7) ceasing introduction of the modulating gas if the monitored temperature is less than the second predetermined temperature.

30. A method according to claim 29, wherein the second predetermined temperature is lower than the first predetermined temperature.

31. A method according to claim 30, wherein the second predetermined temperature is from about 30° C. to about 52° C.

32. A method according to claim 20, wherein the first predetermined temperature is from about 30° C. to about 60° C.

33. A method according to claim 20, additionally comprising imparting energy to the feed stream by compressing the feed stream.

34. A method according to claim 20, additionally comprising imparting energy to the feed stream by heating the feed stream.

35. A method according to claim 20, wherein the temperature of the modulating gas or vapor is less than that of the feed stream.

36. A method according to claim 20, wherein the relative humidity of the modulating gas or vapor is less than that of the feed stream.

37. A method according to claim 20, wherein the relative humidity of the effluent stream is less than about 25%.

38. A method for preparing a contaminated gaseous or vaporous feed stream for treatment in a processing unit that is sensitive to the temperature and/or relative humidity of the feed stream comprising:
compressing the feed stream to provide a higher temperature effluent stream;
monitoring the temperature of the effluent stream;
comparing the monitored temperature to a desired temperature for treatment in the processing unit;
introducing a modulating gas or vapor to the feed stream prior to compressing it if the monitored temperature exceeds the desired temperature; and
treating the effluent stream in the processing unit to remove contaminants.

39. A method according to claim 38, wherein the processing unit employs carbon adsorption techniques.

40. A method according to claim 38, wherein the relative humidity of the effluent stream is less than about 25%.

41. A method according to claim 38, wherein the modulating gas or vapor has a lower temperature than that of the feed stream.

42. A method according to claim 38, wherein the modulating gas or vapor has a lower relative humidity than that of the feed stream.

43. A method according to claim 38, wherein the modulating gas or vapor comprises ambient air.

44. A method according to claim 38, further comprising:
evaluating the monitored temperature t determine whether it is less than a second predetermined temperature; and
ceasing the introduction of the modulating gas if the monitored temperature is less than the second predetermined temperature.

45. A method according to claim 44, wherein the second predetermined temperature is lower than the first predetermined temperature.

* * * * *

UNITED STATES PATENT AND TRADEMARK OFFICE
CERTIFICATE OF CORRECTION

PATENT NO. : 5,271,557
DATED : December 21, 1993
INVENTOR(S) : R. Larry Lynch and Jeffrey Powell It is certified that error appears in the above-identified patent and that said Letters Patent is hereby corrected as shown below:

```
Col. 2, line 34, replace "e.g.." with --e.g.,--.
Col. 7, line 17, delete "S".
Col. 11, line 21, replace "i.e.." with --i.e.,--.
Col. 13, line 44, before "foot", insert --sixty--.
Col. lines 31-32, replace "consideration" with --considerations--.

Col. 16, line 57 , replace "subsutface" with --subsurface--.
Co. 18, line 30, replace "t" with --to--.
```

Signed and Sealed this

Twelfth Day of July, 1994

Attest:

BRUCE LEHMAN

Attesting Officer

Commissioner of Patents and Trademarks